(No Model.)

G. W. HARRIS.
PEANUT AND COFFEE ROASTER.

No. 317,348. Patented May 5, 1885.

WITNESSES

George W. Harris
INVENTOR

Attorney

United States Patent Office.

GEORGE W. HARRIS, OF PROSPECT, KANSAS.

PEANUT AND COFFEE ROASTER.

SPECIFICATION forming part of Letters Patent No. 317,348, dated May 5, 1885.

Application filed June 14, 1884. (No model.)

*To all whom it may concern:*

Be it known that I, GEORGE W. HARRIS, a citizen of the United States of America, residing at Prospect, in the county of Republic, and State of Kansas, have invented certain new and useful Improvements in Peanut and Coffee Roasters, and I do hereby declare the following to be a full, clear, and exact description of the invention, such as will enable others skilled in the art to which it appertains to make and use the same, reference being had to the accompanying drawings, and to letters or figures of reference marked thereon, which form part of this specification.

This invention is a coffee-roaster; and it consists in the improvements hereinafter described, whereby the roaster may be readily attached to an ordinary stove or other heating source, the supply of heat controlled, the coffee readily introduced into the roasting-cylinder, and effectively roasted therein without the employment of stirrers or agitating devices.

Figure 1:
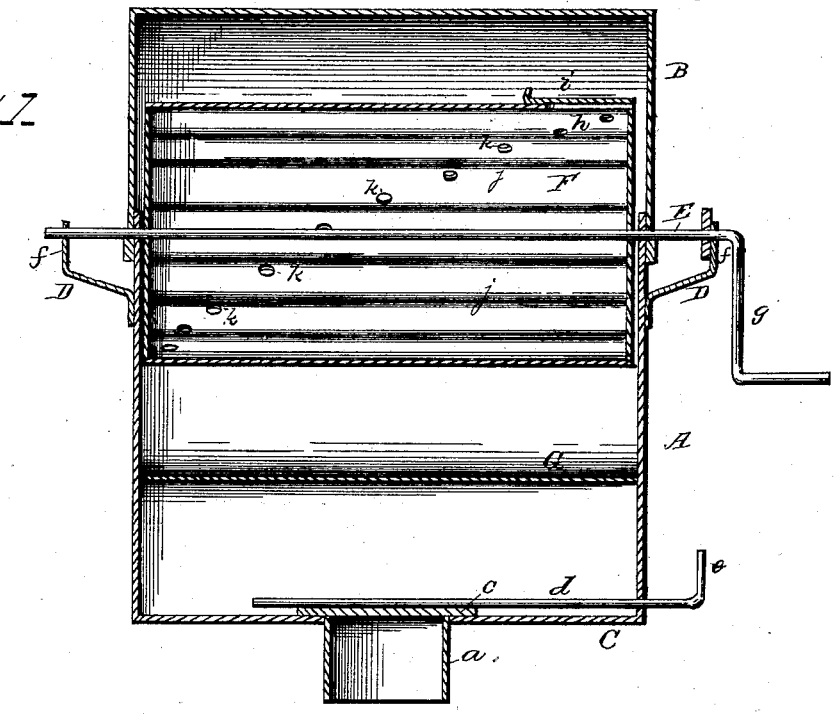
Figure 2:
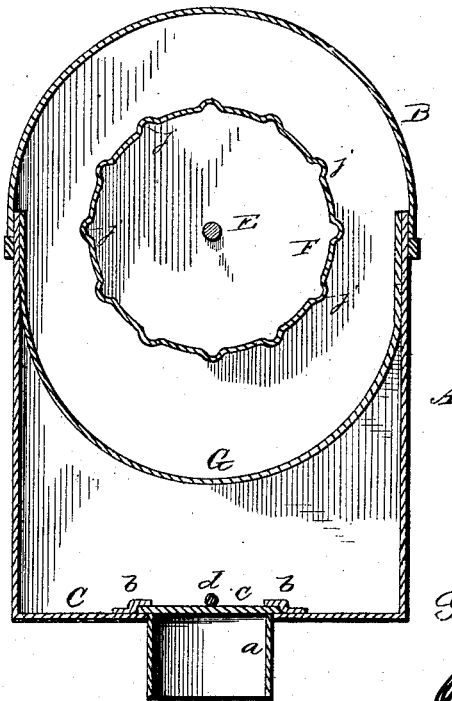

In the accompanying drawings, Figure 1 is a central longitudinal section of my improved coffee-roaster. Figure 2 is a transverse section of the same.

A represents a rectangular receptacle the top of which is covered by a semi-cylindrical cap, B. The bottom C of the receptacle A is provided with a central opening from which depends a flange or collar, $a$, adapted to enter one of the openings of a stove, or to embrace the end of the heating-drum. Ribs or flanges $b\ b$ are arranged at each side of the central opening, so as to form grooves at each side of the same, beneath which play the side edges of a damper or slide, $c$, to which is attached the rod $d$, one end of which extends through and beyond the front of the receptacle A, and is turned up to form an operating-handle, $e$.

At the upper central portion of the front and rear side of the receptacle A are located ears D, a portion of which, $f$, are bent up vertically and perforated to form bearings for a longitudinal shaft, E, the front end of which is extended and bent to form a crank-handle, $g$. A cylindrical drum or chamber, F, is keyed on the shaft E, between the front and rear sides of the receptacle A, and the said drum or chamber has an opening, $h$, at one end, which is closed by a slide, $i$, which plays longitudinally in grooves in a manner similar to the slide $c$. The said drum or chamber is provided with a series of longitudinal corrugations or depressions, $j$, as shown, and with a diagonal series of openings, as indicated in Fig. 1. A curved partition or plate divides the upper and lower portions of the receptacle A into two compartments, thereby withholding the cylinder F from the direct action of the heat, and thereby further preventing the escape of the aroma. The coffee is introduced through the opening $h$, which is then closed by the slide $i$, and the handle $g$ operated to revolve the cylinder, the unequal corrugated surface of which prevents the packing or adhering of the coffee at any point thereof, and obviates the necessity of stirrers. The opening $k$ permits the ready circulation of heat and air to the coffee.

It will of course be understood that after the introduction of the coffee into the cylinder F, and the closing of the slide $i$ of the same, the cap B will be placed in position.

By adjusting the slide $c$ by means of the handle $e$ and the rod $d$ the intensity of the heat may be increased or diminished at pleasure.

I claim—

The combination, in a peanut and coffee roaster, of a casing having a heat-supply opening and longitudinally corrugated cylinder located in said chamber, mounted on a horizontal shaft, and provided with a diagonal series of openings, and an operating-crank for said shaft, said cylinder being provided with an opening for the material, a slide adapted to cover said opening, and a curved dividing-partition interposed between said cylinder and the heat-supply opening, substantially as set forth.

In testimony whereof I affix my signature in presence of two witnesses.

GEORGE W. HARRIS.

Witnesses:
L. R. WHITE,
GEO. D. WHITE.